United States Patent [19]

Tahara et al.

[11] Patent Number: 5,246,755
[45] Date of Patent: Sep. 21, 1993

[54] SEALING MATERIAL FOR ELECTRIC WIRE CONNECTION

[75] Inventors: Masaharu Tahara; Kiyonobu Yoshimura, both of Osaka, Japan

[73] Assignee: Nitto Denko Corporation, Osaka, Japan

[21] Appl. No.: 701,913

[22] Filed: May 17, 1991

[30] Foreign Application Priority Data

May 19, 1990 [JP] Japan .................... 2-129498
Jan. 14, 1991 [JP] Japan .................... 3-14766

[51] Int. Cl.$^5$ .............................. B32B 7/06
[52] U.S. Cl. ....................... 428/40; 428/43; 428/78
[58] Field of Search ............. 428/40, 78, 43; 156/47

[56] References Cited

U.S. PATENT DOCUMENTS

| | | | |
|---|---|---|---|
| 3,203,823 | 8/1965 | Grimes | 428/198 |
| 3,523,846 | 8/1970 | Muller | 428/355 X |
| 3,658,635 | 4/1972 | Eustice | 428/461 X |
| 4,074,492 | 2/1978 | Simpson et al. | 52/419 |
| 4,135,017 | 1/1979 | Hoffmann, Sr. | 428/78 |
| 4,209,352 | 6/1980 | Diaz et al. | 156/213 X |
| 4,382,305 | 5/1983 | Hall et al. | 428/76 X |
| 4,770,937 | 9/1988 | Yagyu et al. | 428/383 |
| 4,862,535 | 9/1989 | Roberts | 428/100 X |
| 4,863,535 | 9/1989 | More | 428/68 X |

FOREIGN PATENT DOCUMENTS 2028601 3/1980 United Kingdom .
2119754 11/1983 United Kingdom .

Primary Examiner—Henry F. Epstein
Attorney, Agent, or Firm—Sughrue, Mion, Zinn, Macpeak & Seas

[57] ABSTRACT

A sealing material for an electric wire connection, comprising a tape-form releasable material, viscous sealing pieces comprising a waterproofing compound, each piece having a width narrower than the width of the releasable material and being releasably formed on one surface of the releasable material, and a sheet-form base material having a larger area than the viscous sealing piece such that each end of the base material projects over each edge portion of the viscous sealing piece formed in one body on each viscous sealing piece, a sealing method for an electric wire connection using the sealing material, and a method for producing the sealing material.

7 Claims, 2 Drawing Sheets

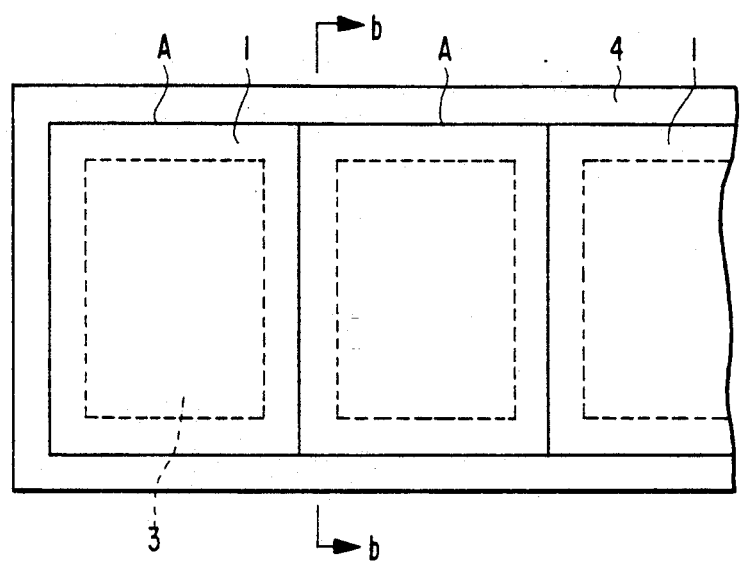
FIG. 1A
FIG. 1B
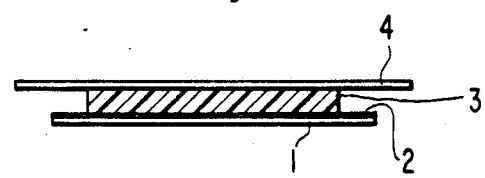
FIG. 2
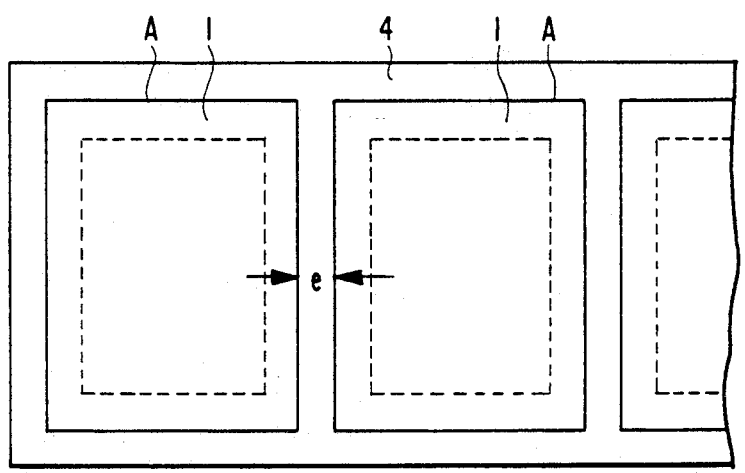
FIG. 3
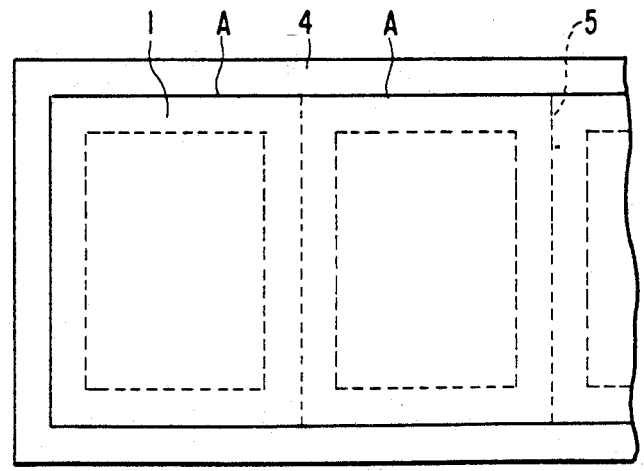

5,246,755

SEALING MATERIAL FOR ELECTRIC WIRE CONNECTION

FIELD OF THE INVENTION

The present invention relates to a sealing material for an electric wire connected portion, which is used for a sealing treatment of an electric wire connected portion, a sealing method for an electric wire connected portion, and a method of producing such a sealing material.

BACKGROUND OF THE INVENTION

Hitherto, in the case of a sealing treatment of a small sized electric wire connected portion, in particular, a branched electric wire connected portion (e.g., a branched portion of a wire furnace of an automobile), it is known that an electric wire connected portion is covered with a composite sealing material wherein a viscous sealing piece is formed on one surface of a film with the viscous sealing piece being inside and pressing the sealing material by a press, whereby the viscous sealing piece is pressed into the portion to be sealed, such as an inner corner portion between the end of the coated layer on electric wires and a conductor connecting metal fittings as described in U.S. Pat. No. 4,863,535.

In this method, the composite sealing material covering the electric wire connected portion is pressed with a press in a state of covering the viscous sealing piece with the film.

However, since the viscous sealing piece of the composite sealing material is packed up in a small unit, the sealing work cannot be continuously carried out and it is difficult to employ automation for the sealing work. Also, a sealing piece has an intermediate property between a fluid and an elastic material, but in the above method, the property of the viscous sealing piece as a fluid is utilized for the compression of the viscous sealing piece. That is, a system wherein the fluid is contained in cells of the film and the fluid is pressed by reduction of the volume in the cell by compression is used. Accordingly, it is necessary to press the composite sealing material which covered an electric wire connected portion by folding the sealing material in a state of closing the end of the film. Thus, the force of pressing is increased, the pressing operation is complicated, and the sealing piece is extruded to cause a hindrance for the subsequent work.

SUMMARY OF THE INVENTION

The object of the present invention is to provide a sealing material for an electric wire connected portion which can continuously supply the sealing materials and in the case of sealing an electric wire connected portion by covering the electric wire connected portion with a composite sealing material wherein a viscous sealing piece is formed on one surface of a film with the viscous sealing piece being inside and pressing the sealing piece with a press, and is capable of easily performing the pressing operation by utilizing the elastic property of the viscous piece in the composite sealing material, and also to provide a sealing method of an electric wire connected portion by using the sealing material.

BRIEF DESCRIPTION OF THE DRAWINGS

FIG. 1A is a plane view showing an example of the sealing material of the present invention, FIG. 1B is a sectional view of the sealing material of FIG. 1A cut along the line b—b, FIG. 2 and FIG. 3 each is a plane view showing other example of the sealing material of the present invention, FIG. 4, FIG. 5, and FIG. 6 each is a sectional view showing each example of the sealing material of the present invention releasing each releasable material, FIG. 7 and FIG. 8 each is a plane view showing a press type which is used for pressing a covered material with the sealing material of the present invention.

DETAILED DESCRIPTION ON THE INVENTION

Figure 4:
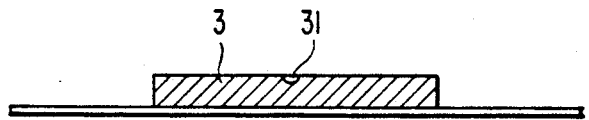

The sealing material for an electric wire connection according to the present invention comprises a tape-form releasable material, viscous sealing pieces comprising a waterproofing compound, each piece having a width narrower than the width of the releasable material and being releasably formed on one surface of the releasable material, and a sheet-form base material having a larger area than the viscous sealing piece such that each end of the base material projects over each edge portion of the viscous sealing piece formed in one body on each viscous sealing piece.

In the sealing material of the present invention, a mark such as a concaved groove or a convex line for doubling the viscous sealing piece along an almost center line can be formed or such a mark can be formed by using a viscous material having a different color.

Also, the sheet-form base material which is formed in one body on the viscous sealing piece usually comprises a soft polyvinyl chloride film or sheet having flexibility and a good insulating property. The sheet-form base materials may be separately from each other or in a continuous form, but in the latter case, it is preferred that a cutting line is formed between each of the base materials such that each base material can be separated from other base material.

Another embodiment of the present invention is to provide a sealing method for an electric wire connected portion, which comprises covering the electric wire connected portion comprising a main wire and branched wires with the sealing material for electric wire connected portion separated from the tape-form releasable material with the viscous sealing piece being inside, and pressing the covered material from at least one side of the direction nearly parallel with the covered material to adhere the viscous sealing piece to the surfaces of the electric wires.

Furthermore, in the sealing material for an electric wire connected portion having the mark for doubling, the electric wire connected portion is covered with the sealing material separated from the tape-form releasable material using the mark as a basis with the viscous sealing piece being inside, and the viscous sealing piece is adhered to the surfaces of the electric wires by the same manner as above.

As a pressing means, a press mold can be used, and it is preferred that many small projections are dispersedly formed on the surface of the press mold which contacts with the covered material or many convex stripes are formed on the surface of the press mold.

Also, in the present invention, by extending the inner viscous sealing piece by compressing in the thickness direction by pressing the covered material, i.e., the electric wire connected portion covered with the sealing material of the present invention, the viscous sealing piece is strongly adhered to the connected portion of the electric wires and the surfaces of the electric wires to provide a sufficient watertight property.

Furthermore, in the sealing material of the present invention, the viscous sealing piece exists in the inside of the edges of the sheet-form base material and hence the protrusion of the viscous sealing piece from the edges of the base material can be prevented when the viscous sealing piece extends by pressing, whereby attaching of the viscous sealing material to hands, the press mold, and/or other articles can be prevented.

The present invention is further described in more detail by reference to the accompanying drawings.

As shown in FIG. 1A which is a plane view showing a n example of the sealing material of the present invention and FIG. 1B which is a sectional view cut at the line b—b in FIG. 1A, viscous sealing pieces 3 are formed on one surface of a tape-form releasable material 4 and a sheet-form base material 1 is formed in one body on the viscous sealing piece 3. In addition, as shown in FIG. 1B, an adhesive layer 2 may be formed, if necessary, on the base material 1 at the sealing piece side.

The releasable material 4 shown in FIG. 1A is generally a self-supporting material comprising a paper and a plastic layer coated thereon, and usually a layer of a resin showing a low adhesive property to a viscous material, such as a silicone resin, is formed on the surface of the plastic layer. The releasable material 4 may, as the case may be, comprise of a plastic film or sheet having a self-supporting property, such as polyester and polyolefin.

There is no particular restriction on the length of the releasable material 4, but the releasable material can have a length capable of temporarily attaching releasably from several to several thousands insulating pieces A each comprising a sealing piece 3 and a base material 1. If the releasable material having many pieces A attached temporarily is wound in a roll form, the keeping space thereof can be small.

There is no particular restriction on the size of the viscous sealing piece 3 if the width of the sealing piece 3 is narrower than the width of the releasable material 4, and the form of the sealing piece 3 is not only a rectangle as shown in the FIGURES but also may be, for example, a disk, a trapezoid, etc.

It is fundamentally necessary that one sheet-form base material 1 is independently formed in one body on each viscous sealing piece 3, but as shown in FIG. 3, the sheet-form base material 1 may comprise a substantially continuous long base material having each cutting line 5 such as a sewing machine seam, etc., between two sealing pieces capable of being separated at the cutting line.

Also, as shown in FIG. 1A, the base materials 1 may be formed in a state of substantially contacting with each other or as shown in FIG. 2, the base materials 1 may be formed with a gap shown by a mark e between them. The width of the base material 1 is preferably narrower than the width of the releasable material 4 as shown in FIG. 1A, FIG. 2, and FIG. 3, but the width of the base material may be same as or broader than the width of the releasable material 4. In any cases, it is desirable that all the edge portions of the sheet-form base material 1 protrude over the viscous sealing piece 3.

The viscous sealing piece can comprise a waterproofing compound having excellent adhesion to electric wires, insulating property, and water resistance. The waterproofing compound comprises a synthetic rubber including a non-vulcanized butyl rubber and compounding agents such as a plasticizer, a rubber reinforcing agent, a filler, a softening agent, etc. The thickness of the viscous sealing piece is in the range of from 0.5 mm to 10 mm and is required to be at least ⅓ of the outside diameter of electric wires being sealed.

As the sheet-form base material, a soft polyvinyl chloride film or sheet is used as described above, but polyolefins, thermoplastic elastomers, etc., may be used and a material which extends temporarily by pressing of the covered material and can be restored by removing the stress can be used.

At the contact side of the viscous sealing piece 3 with the releasable material 4 (that is, the contact side with the electric wire connected portion) can be formed a mark at an almost center line in a direction parallel to or perpendicular to the lengthwise direction of the releasable material 4 from one side of the sealing piece 3 to the other side. The mark is useful for correctly matching the position of the electric wire connected portion.

Figure 5:
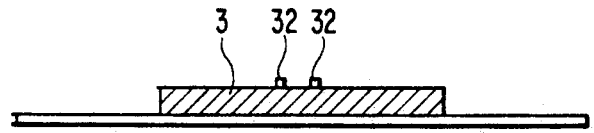
Figure 6:
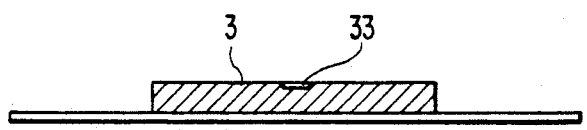

FIG. 4 shows the mark formed by a concaved groove 3, FIG. 5 shows the mark formed by two parallel convex lines 32, 32, and FIG. 6 shows the mark formed by a viscous material 33 composed of the same material as the viscous sealing piece 3 but having a different color. However, it will be understood that other marks can be employed in the present invention.

The sealing material for electric wire connection of the present invention can be produced continuously and at a low cost by the following two methods.

According to one method, a viscous sealing material is extruded from a die in a tape form, the tape form material is cut in a width narrower than the width of a tape-form releasable material travelling at a cross direction and in front thereof to form each viscous sealing piece, the viscous sealing pieces are attached onto the continuously or intermittently travelling tape-form releasable material with a constant interval, and before or after attaching the viscous sealing piece, the sheet-form base material is attached in one body onto the sealing piece.

According to another method, a viscous sealing material is extruded from a die in a tape form, the tape-form viscous sealing material is attached to the surface of a continuous long sheet-form base material having projected portions with a constant interval at the opposite surface of the base material, the tape-form sealing material is cut at the projected portions together with the sheet-form base material, and the cut pieces are attached onto a travelling tape-form releasable material (having a width broader than the width of the viscous sealing piece of the cut piece) at a constant interval through the viscous sealing piece.

Figure 7:
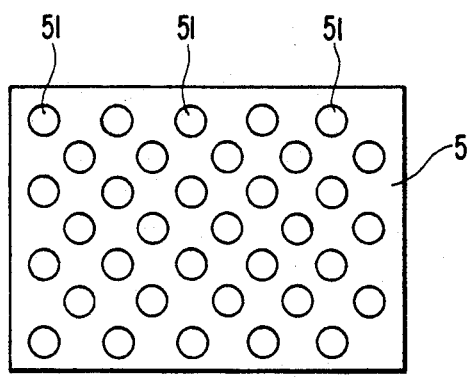
Figure 8:
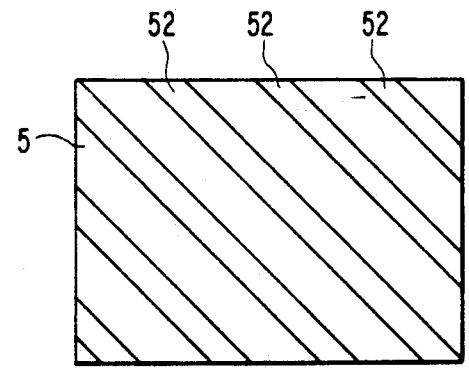

In the sealing method of an electric wire connected portion of the present invention, a press mold is usually used for pressing. When the form of the conductor connected portion is complicated, for example, in the case of a branched wire connected portion, it is preferred that small projections 51, . . . are dispersedly formed on at least one press mold 5 as shown in FIG. 7 or convex stripes 52, . . . (having usually a height of from 0.2 to 7.0 mm) are formed thereon as shown in FIG. 8, and the projections or the convex stripes intruded into the film to accelerate entering of the viscous sealing piece into gaps in the electric wire connected portion and the inner corner thereof.

Also, when the outer diameter of a conductor connecting metal fittings is larger than the outer diameter of an electric wire, it is effective to form a groove (having usually a plane area of at least $5 \times 20$ mm$_2$ and a depth of at least 0.2 mm) for partially receiving the metal fittings on the press plate capable of pressing end portion of the electric wire.

Figure 9:
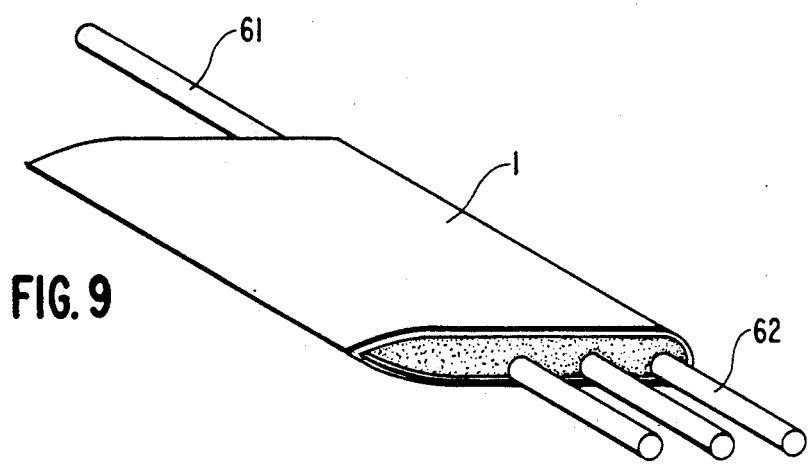
FIG. 9 is a slant view showing an electric wire connected portion sealed by the sealing method of the present invention.

FIG. 9 shows an example of sealing an electric wire connected portion comprising a main electric wire 61 and branched electric wires 62 using the sealing material for electric wire connection of the present invention having a mark (not shown).

In this example, the sealing material for an electric wire connected portion having a concaved groove 31 shown in FIG. 4 is used, an electric wire connected portion is applied to the groove 31 to perform position matching, the sealing material is doubled with the viscous sealing piece being inside using the groove 31 as a standard line to superpose the viscous sealing piece with each other, and the covered material is pressed by a press mold in the thickness direction with the end portions of the sheet-form base material 1 in open state to complete sealing. According to the method, since the doubled viscous sealing piece is pressed with the end portions of the sheet-form base material in an open state, the movement of the sealing material is not restricted so much, whereby a sufficient adhered area is obtained between the surface of the electric wires and the sealing material at a low pressing pressure, the sealing material does not extrude from the end of the sheet-form base material, and a good electric wire connected portion is obtained.

As described above, according to the sealing material for an electric wire connected portion of the present invention, the sealing material can be continuously supplied and thus the sealing work can be continuously carried out and can be easily applied to an automation line.

Also, by covering an electric wire connected portion by doubling the sealing material having the viscous sealing piece formed on one surface of the sheet-form base material leaving the peripheral portions, and pressing the covered material with the ends of the base material in open state, protrusion of the sealing material at pressing can be prevented and a desired sealing effect is obtained by a low pressing pressure.

Furthermore, according to the production method of the sealing material of the present invention, the sealing material can be continuously produced and thus the product having uniform quality can be obtained at a low cost.

While the invention has been described in detail and with reference to specific embodiments thereof, it will be apparent to one skilled in the art that various changes and modifications can be made therein without departing from the spirit and scope thereof.

What is claimed is:

1. A sealing material for an electric wire connection, comprising in order:
   1) a tape-form releasable material,
   2) viscous sealing pieces comprising a waterproofing compound, and
   3) a sheet-form base material,
   each viscous sealing piece having a width narrower than the width of the releasable material and being releasably formed on one surface of the releasable material, and the sheet-form base material having a larger area than the viscous sealing piece such that each edge of the base material projects over each edge portion of the viscous sealing piece.

2. The sealing material of claim 1, wherein a mark for positioning is formed at almost the center of the viscous sealing piece at the side adhering to the releasable material.

3. The sealing material of claim 2, wherein the mark is formed as a concaved groove or a convex projection.

4. The sealing material of claim 2, wherein the mark is formed with a viscous material having a different color.

5. The sealing material of claim 1, wherein the sheet-form base materials are in substantial contact with each other.

6. The sealing material of claim 1, wherein the adjacent sheet-form base materials have a gap between said base materials.

7. The sealing material of claim 1, wherein the sheet-form base materials are in a substantially continuous long form and a cutting line is formed between two adjacent base materials.

* * * * *